United States Patent

Johannesson et al.

Patent Number: 5,730,552
Date of Patent: Mar. 24, 1998

[54] PIPELINE ANCHOR APPARATUS

[76] Inventors: Neale J. Johannesson; Zita A. Fulawka, both of 4212-16A St. S.W., Calgary AB, Canada, T2T 4L4

[21] Appl. No.: 595,809

[22] Filed: Feb. 2, 1996

[51] Int. Cl.⁶ .................................................. F16L 1/12
[52] U.S. Cl. .......................... 405/172; 248/49; 248/505; 248/508; 405/154
[58] Field of Search .................... 248/49, 505, 507, 248/508; 405/154, 157, 172

[56] References Cited

U.S. PATENT DOCUMENTS

| | | | |
|---|---|---|---|
| 3,170,663 | 2/1965 | Fite | 248/49 |
| 3,494,849 | 2/1970 | Hess. | |
| 3,903,704 | 9/1975 | Spindonov. | |
| 4,338,045 | 7/1982 | Cour | 405/172 |
| 4,389,034 | 6/1983 | Suttles | 405/172 X |
| 4,492,493 | 1/1985 | Webb | 405/172 |
| 4,826,111 | 5/1989 | Ismert | 405/172 X |

FOREIGN PATENT DOCUMENTS

| | | | |
|---|---|---|---|
| 628331 | 10/1961 | Canada | 405/172 |
| 1783217 | 12/1992 | Russian Federation. | |
| 1789822 | 1/1993 | Russian Federation. | |
| 621937 | 8/1978 | U.S.S.R. | 248/49 |
| 769175 | 10/1980 | U.S.S.R.. | |
| 1234699 | 5/1986 | U.S.S.R.. | |
| 1314177 | 5/1987 | U.S.S.R.. | |
| 1585610 | 8/1990 | U.S.S.R.. | |
| 2036918 A | 7/1980 | United Kingdom | 405/172 |

*Primary Examiner*—Derek J. Berger
*Attorney, Agent, or Firm*—David S. Thompson

[57] ABSTRACT

A pipeline anchor apparatus provides left and right anchor units connected by a tie-down strap made of heavy-duty polyester or nylon webbing. The strap prevents the pipeline from floating in wet conditions. By flexibly conforming to the surface of the pipeline, the tie-down strap prevents denting of the pipeline which weakens the pipeline, contributing to pipeline bending. Each anchor unit provides a helix anchor attached to an anchor rod that is buried deep in the soil. The anchor rod is connected to an extension rod by a lower coupling. A tie-down bracket having a tubular body and a sleeve is carried by the extension rod. Each end of the tie-down strap is attached to the sleeve of a tie-down bracket of an anchor unit. The tie-down brackets may pivot about the extension rod to lessen stress as water forces the pipeline upwardly, against the tie-down strap. The sleeve of the tie-down bracket is radially outwardly from the axis of the tubular body. As a result, an upward force on the sleeve may force the tie-down bracket and extension rod away from the pipeline, thereby protecting the pipeline from denting and bending.

5 Claims, 6 Drawing Sheets

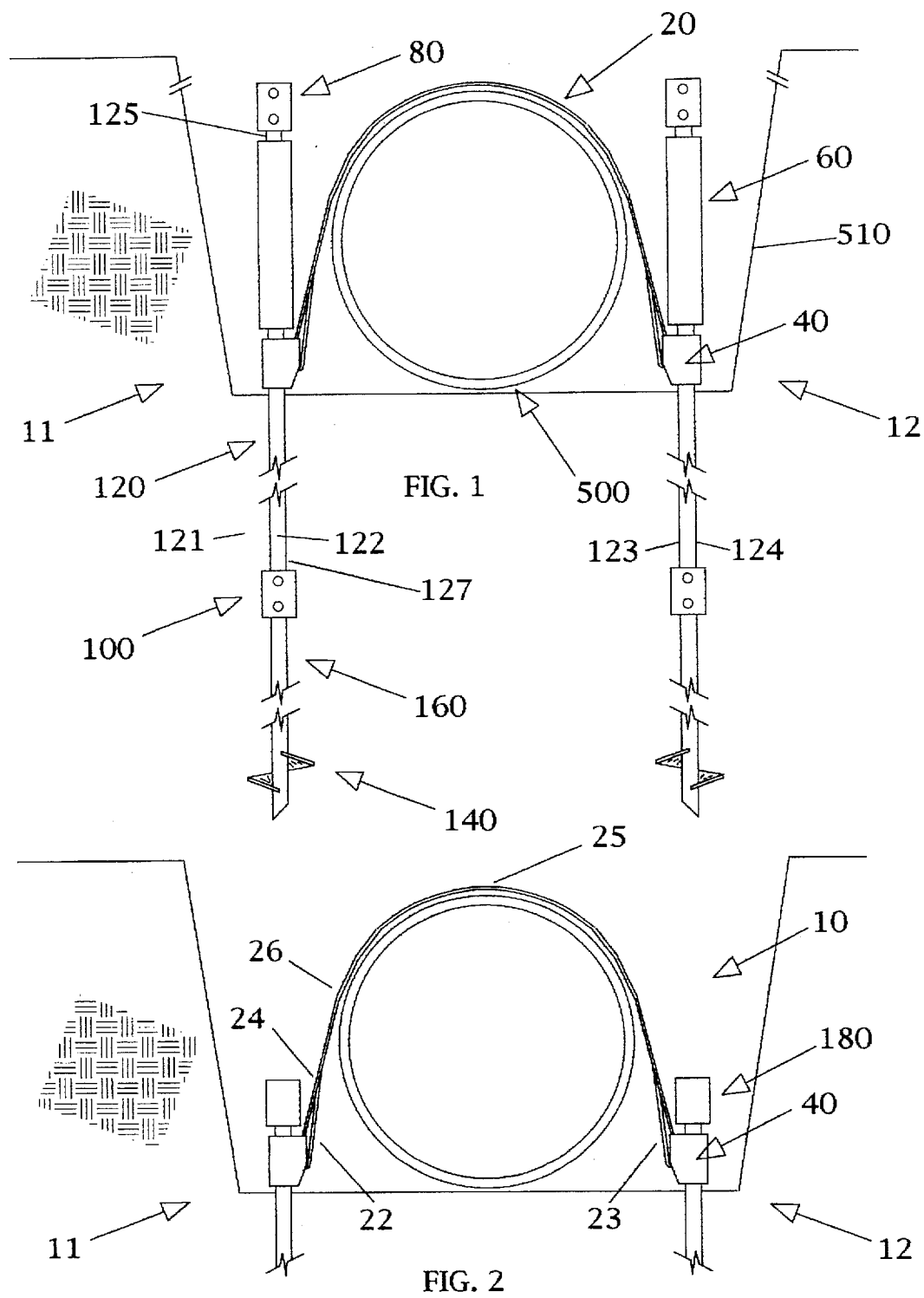

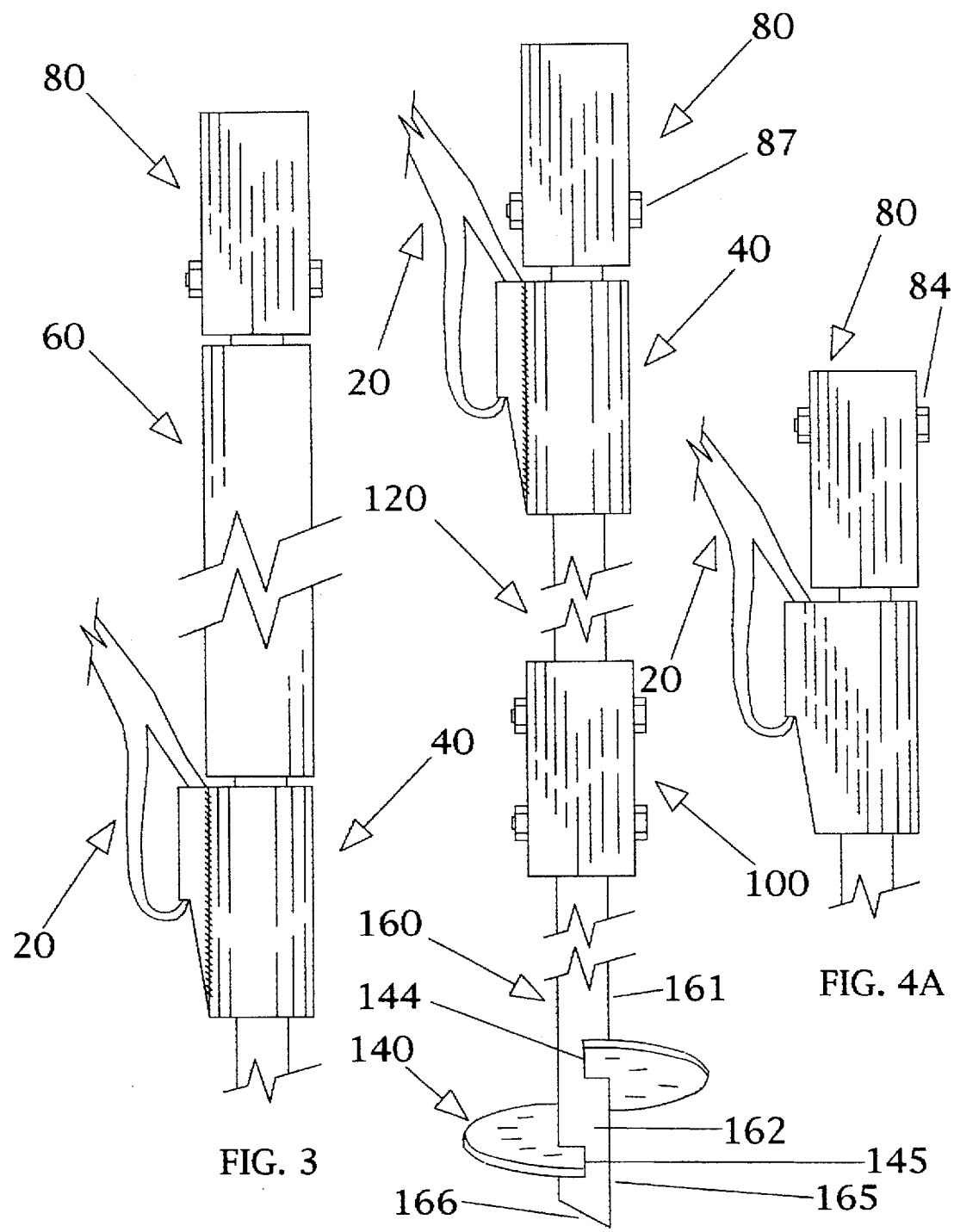

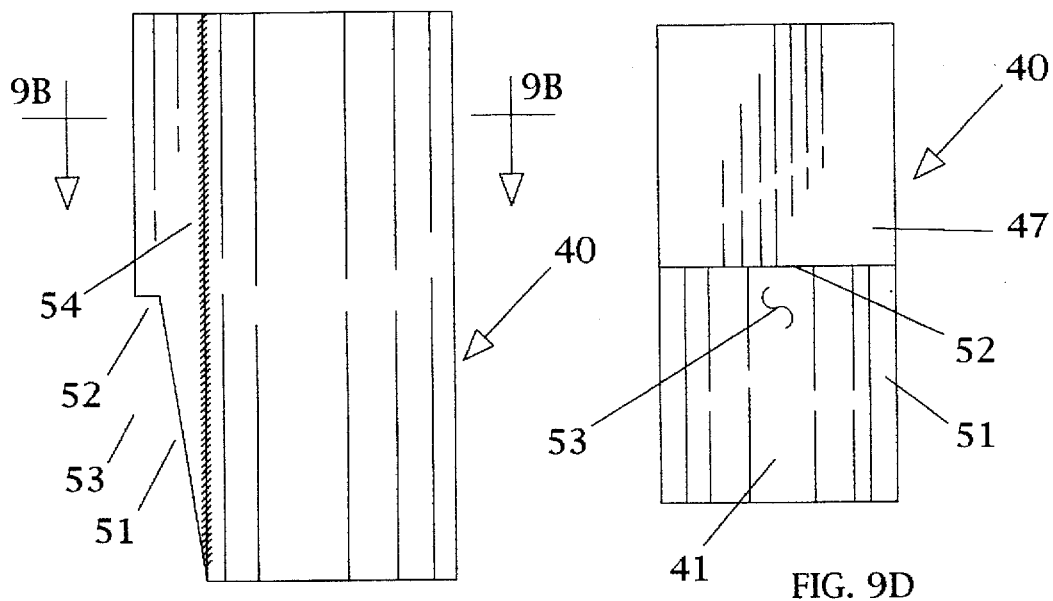
FIG. 5
FIG. 9D
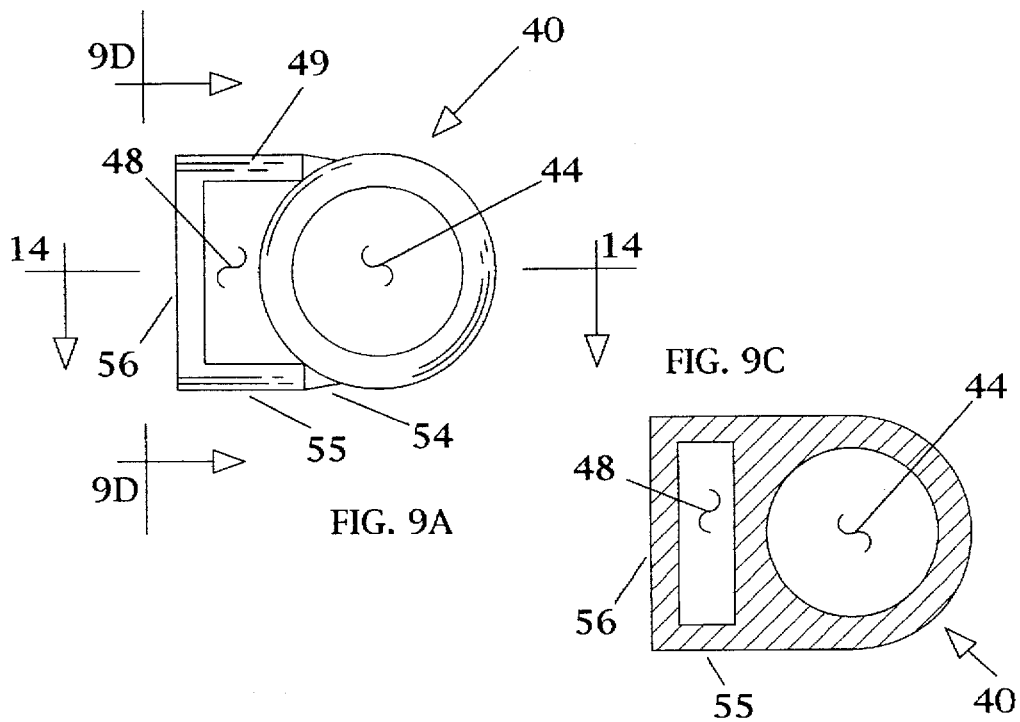
FIG. 9A
FIG. 9C

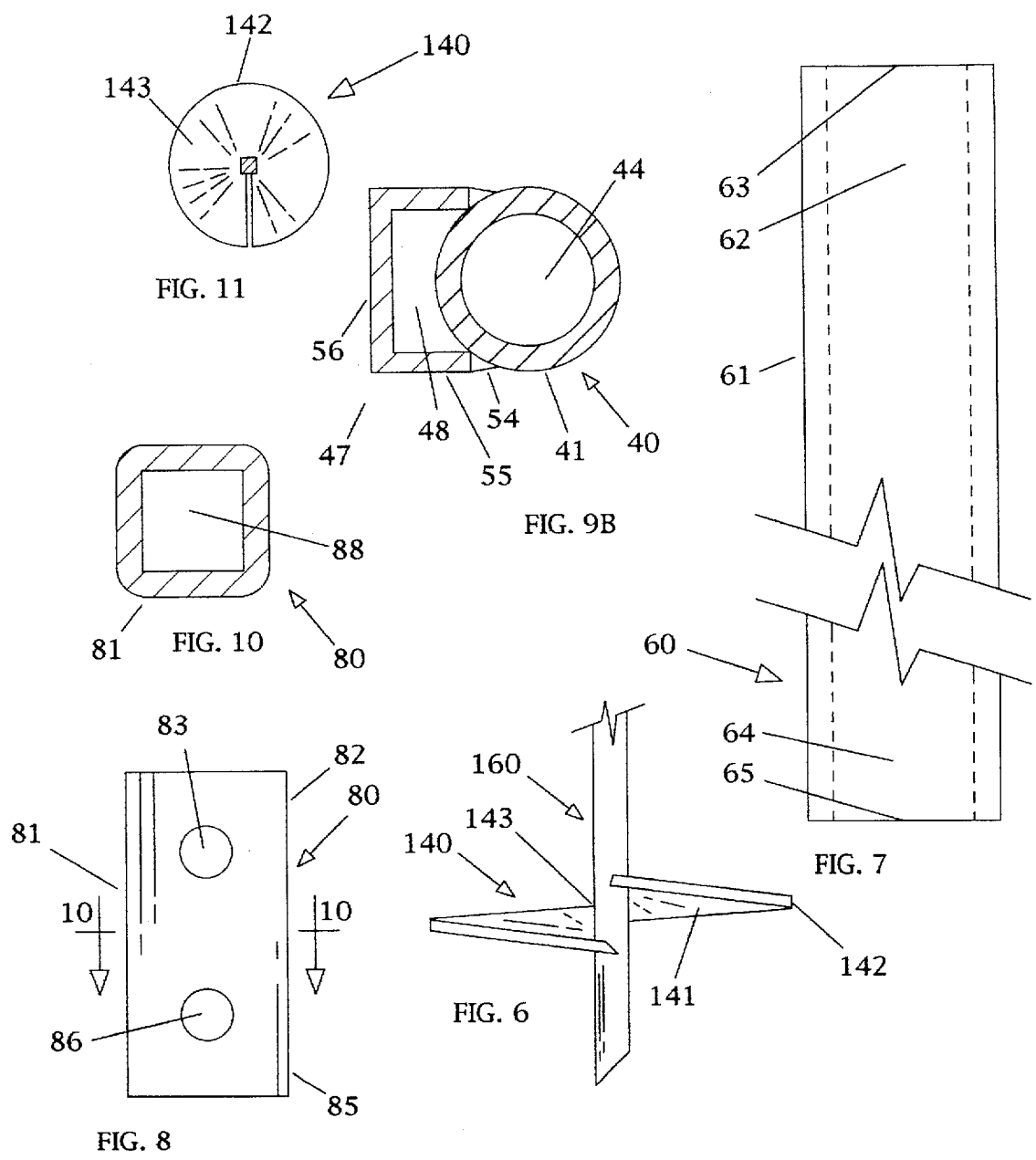

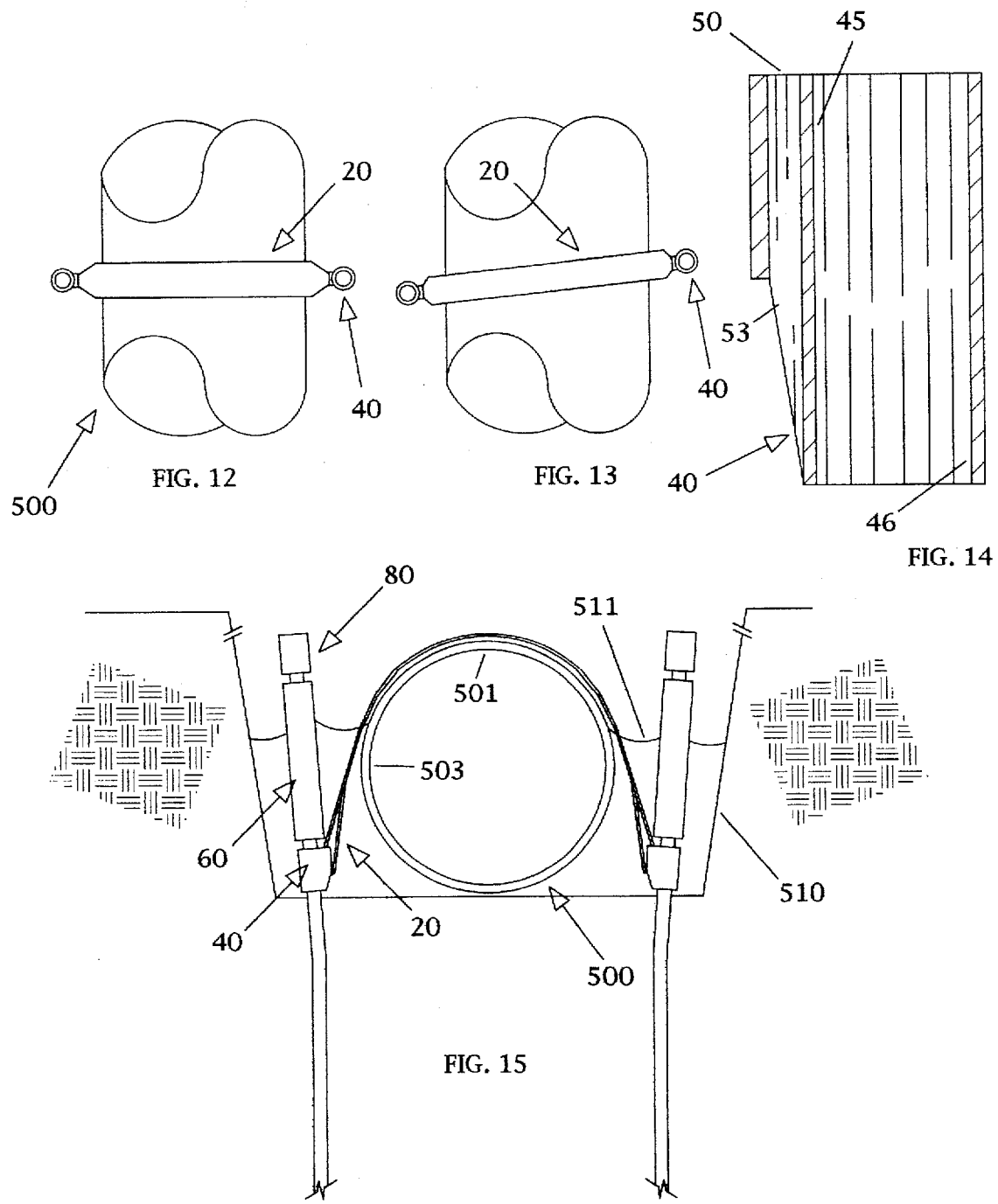

PIPELINE ANCHOR APPARATUS

CROSS-REFERENCES

There are no applications related to this application filed in this or any foreign country.

BACKGROUND

A variety of pipeline anchoring structures are known for anchoring and stabilizing gas, oil, and other types of pipelines located in lakes, rivers, swamps and permafrost. Such structures are important to prevent pipeline movement, which can result in degradation of the pipeline structure, and ultimately to leaks, explosions, or environmental damage. Pipeline movement is often caused by water which tends to float oil and gas pipelines having positive buoyancy. As a result, a variety of anchor and weight structures have been developed, none of which has completely solved the problem.

Unfortunately, the elongate nature of pipelines results in considerable leverage, and the need to anchor the pipeline at frequent intervals. Failure to properly anchor a section of pipeline may result in that section floating, and therefore putting considerable stress on an adjacent properly anchored section of pipeline. Frequently, this causes a pipeline to bend in the area of an anchor.

It generally the case that, until bent, a pipeline can resist a considerable moment of force. However, once a pipeline becomes somewhat deformed, the natural strength resulting from the circular cross-section is rapidly lost. Unfortunately, prior art anchors have tended to bend pipelines, thus to a degree contributing to the problem. This is the generally caused by rigid structures that are used to prevent elevation of the pipeline. Rigid structures generally fail to distribute the stress uniformly about a larger area, thereby contributing to deformation of the pipeline.

A further cause of pipeline bending results from prior art pipeline anchor devices pinching the sides of the pipeline. Sever upward forces by a pipeline can tend to elevate restraining devices going over the top of a pipeline; as a result, the ends of the restraining devices, on either side of the pipeline, tend to forcefully move toward each other, denting the pipeline. Once dented, the pipeline degrades more rapidly, and may rupture.

Additionally, in the event that a pipeline is being anchored in a trench, most pipeline anchoring structures require that workers enter the trench and attach anchoring structures. As a result, workers are at risk from landslides, and trenches must be dug that conform to expensive safety rules.

What is needed is a pipeline anchor apparatus that provides a non-rigid structure that is less likely to deform and weaken a pipeline. The apparatus must provide tie-down structures that distribute the forces involved as widely as possible to avoid pipe deformation. The apparatus must also provide structures that allow workers to secure the tie-down structures without entering the trench. Also, the apparatus must respond to sever upward forces by the pipeline by moving the ends of any tie-down components away from, rather than into, the sides of the pipeline.

SUMMARY

The present invention is directed to an apparatus that satisfies the above needs. A novel pipeline anchor apparatus that reduces the strain on a pipeline is provided.

The pipeline anchor apparatus of the present invention provides:

(a) A helix anchor. The helix anchor structure combines ease of installation beneath the surface of the soil with resistance to unwanted removal. An anchor rod having solid steel construction is attached to the helix anchor. The anchor rod provides a lower wedge point and an upper bolt hole, which is attached to the lower coupling.

(b) A lower coupling. The lower coupling is a tubular sleeve which connects the anchor rod of the helix anchor to a vertical extension rod. In applications requiring great torque to install the helix, the tubular sleeve of the lower coupling would be square in cross-section, and would provide a lower pair of bolt holes to attach to the anchor rod and an upper pair of bolt holes to attach to an extension rod. In lower torque applications, the lower coupling could be round in cross-section, and would provide inner threads to mate with outer threads of the anchor rod and extension rod.

(c) An extension rod. The extension rod provides a solid steel body, typically having a bolt hole at both the upper and lower ends. The lower end is bolted to the upper pair of bolt holes of the lower coupling.

(d) A tie-down bracket. The tie-down bracket provides a tubular body having channel through which the extension rod passes, allowing the tie-down bracket to pivot freely on the extension rod. A sleeve, carried by the tubular body, provides a channel which is radially outwardly from the center of the tubular body channel.

(e) A tie-down strap, having two ends, each end terminated in a loop. The loop on each end passes through, and is attached to, the channel through the sleeve carried by the tie-down bracket. The tie-down strap is carried over the pipeline, and prevents the pipeline from floating, in the event that the pipeline is immersed in water.

(f) A spacer, having a tubular body of typically circular cross-section, is optionally carried by the extension rod above the tie-down bracket. The lower opening of the spacer rests on the top of the tie-down bracket. The spacer allows workers to force the tie-down bracket, and therefore the tie-down strap, downwardly, until the tie-down strap is taut against the top of the pipeline. Due to the length of the spacer, this task may be done from a position of safety, above the pipeline and out of the pipeline trench.

(g) An upper coupling, similar in structure to the lower coupling, is attached to the upper bolt hole of the extension rod. The upper coupling prevents upward movement of the spacer and tie-down bracket. This action prevents upward motion of the loop end of the tie-down strap, and prevents the pipeline from floating. The upper coupling is typically located at an elevation near the top of the pipeline, where workers can easily access it without entering the trench in which the pipeline is located. Upper and lower bolt hole pairs allow the upper coupling to be installed using the bolt hole pair that results in the tightest fit.

It is therefore a primary advantage of the present invention to provide a novel pipeline anchor apparatus that provides a flexible tie-down strap that distributes the forces caused by flotation of a pipeline more widely about the pipeline than is possible with a rigid tie-down component, and thus reduces the possibility of deformation of the pipeline.

It is a further advantage of the present invention to provide a novel pipeline anchor apparatus that provides a pivoting tie-down bracket anchoring each end of the tie-down strap that pivots if necessary to reduce the strain on the tie-down strap, and thereby to move incrementally the flexible tie-down strap to reduce the possibility of deformation of the side of the pipeline.

It is a further advantage of the present invention to provide a novel pipeline anchor apparatus that provides a spacer having a tubular body that may be positioned above the tie-down bracket on the extension rod attached to a helix anchor, forcing the tie-down bracket into place, while allowing workers to remain in a position of safety above the pipeline and out of any associated pipeline trench.

It is a still further advantage of the present invention to provide a novel pipeline anchor apparatus that provides a tie-down bracket providing a tubular body having a sleeve that is radially outwardly from the center of the tubular body and which carries one end of the tie-down strap, that causes the pipeline anchor to move slightly or bend in response to particularly strong forces caused by flotation of the pipeline in a direction away from the pipeline, rather than into the pipeline, thereby lessening the tendency of strong forces to deform the pipeline.

DRAWINGS

These and other features, aspects, and advantages of the present invention will become better understood with regard to the following description, appended claims, and accompanying drawings where:

FIG. 1 is an end view of a version of the invention having an optional spacer installed;

FIG. 2 is an end view of a second version of the invention, not having the optional spacer installed;

FIG. 3 is a somewhat enlarged view of the tie-down strap, tie-down bracket, optional spacer, and upper coupling;

FIG. 4 is a somewhat enlarge view of the right anchor unit;

FIG. 4A is a somewhat enlarged view of the tie-down strap, tie-down bracket, and upper upper coupling;

FIG. 5 is a side view of the tie-down bracket;

FIG. 6 is a side view of a helix anchor attached to an anchor rod;

FIG. 7 is a side view of the optional spacer;

FIG. 8 is a side orthographic view of a coupling;

FIG. 9A is a top view of the tie-down bracket;

FIG. 9B is a cross-sectional view of the tie-down bracket of FIG. 5 along the 9B—9B lines;

FIG. 9C is a cross-sectional view similar to FIG. 9B, of a second species of tie-down bracket;

FIG. 9D is a side view of the tie-down bracket of FIG. 9A in the direction of the 9D—9D lines, showing a side view of the attached sleeve;

FIG. 10 is a cross-sectional view of the coupling of FIG. 8 along the 10—10 lines;

FIG. 11 is a somewhat reduced top view of a helix anchor of FIG. 6;

FIG. 12 is a somewhat diagrammatic top view of a version of the invention installed with the tie-down strap perpendicular to the pipeline;

FIG. 13 is a somewhat diagrammatic top view of a version of the invention installed with the tie-down strap at a slight angle to the pipeline;

FIG. 14 is a cross-sectional view of the tie-down bracket of FIG. 9A, along the 14—14 lines;

FIG. 15 is a view of the version of the invention of FIG. 1, wherein the pipeline is applying considerable upward force to the tie-down strap;

DESCRIPTION

Figure 19:
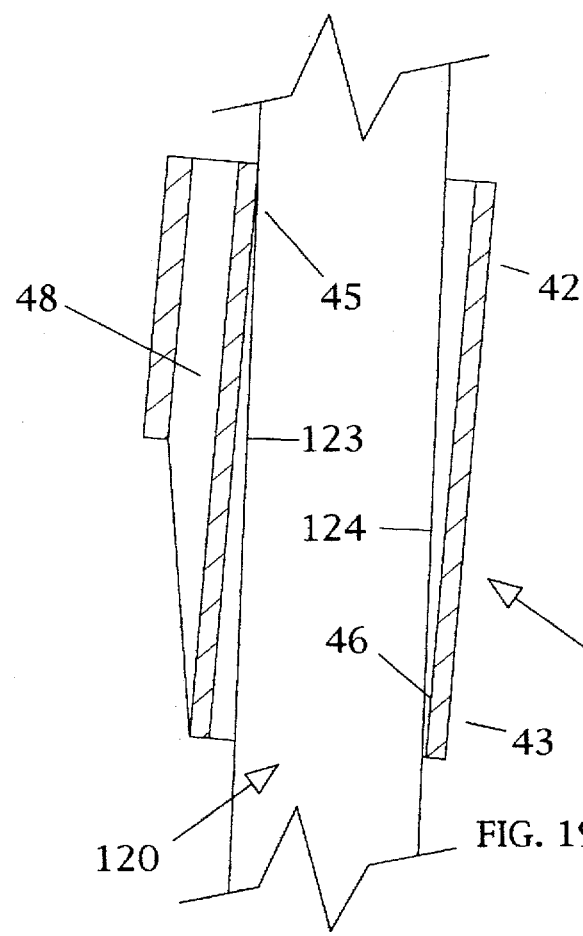
FIG. 19 is a cross-sectional view of the tie-down bracket when the pipeline is being forced upward by water, as seen in FIG. 15.

Referring in particular to FIG. 1, a version of a pipeline anchor apparatus 10 constructed in accordance with the principles of the invention is seen. A tie-down strap 20 is carried on top of a pipeline, and attaches to a left anchor unit 11 and a similar right anchor unit 12. Each tie-down strap provides a left and a right loop and is carried by a tie-down bracket 40 that is carried by an extension rod 120. An optional spacer 60 prevents the tie-down bracket from moving vertically, and is itself prevented from moving vertically by an upper coupling 80. The extension rod 120 is connected to an anchor rod 160 by means of a lower coupling 100. The anchor rod is attached to a helix anchor 140, which prevents the entire apparatus from moving vertically, even when the pipeline 500 attempts to float as a result of water, as seen in FIG. 15.

As seen particularly in FIGS. 4 and 6, a helix anchor 140 is used to anchor the pipeline anchor apparatus 10. The helix anchor 140 is advantageous because it may be inserted into the earth by means of known heavy equipment without having to remove soil, and is extremely difficult to remove. The helix anchor 140 provides a sheet-like body 141 having an outer rim edge 142 and an inner edge 143 attached to the anchor rod 160. An upper radial edge 144 and a lower radial edge 145 are best seen in FIG. 4.

As seen in FIG. 4, an anchor rod 160 is attached to the helix anchor 140. The preferred version of the anchor rod 160 provides a solid steel body 161 having flat sides 162 and a square cross-section. A lower portion 165 provides a wedge point 166, which decreases slightly the amount of energy required to insert the anchor rod and helix anchor into the ground. An upper portion 163 of the body 161 provides a bolt hole which is used to attach the anchor rod 160 to the lower coupling 100.

As seen in FIGS. 1 and 4, a lower coupling 100 connects the anchor rod 160 to the extension rod 120. In the preferred embodiment, the structure of the lower coupling 100 and the upper coupling 80 is identical. Couplings 80, 100 differ only in their placement. As seen in FIGS. 8 and 10, a coupling 80 provides a square tubular body 81 having rounded corners. An upper end 82 having bolt holes 83 in opposite sides, and a lower end 85, also having bolt holes 86 in opposite sides, allow the coupling to be attached as seen in FIG. 1 by an upper bolt 84 and a lower bolt 86. An axial channel 88 is incrementally greater in cross-sectional area than the anchor rod 160 and the extension rod 120. Channel 88 should fit tightly against the anchor rod 160 and the extension rod 120 to reduce some of the strain on the bolts used to fasten the anchor rod, lower coupling, and extension rod together.

Figure 16:
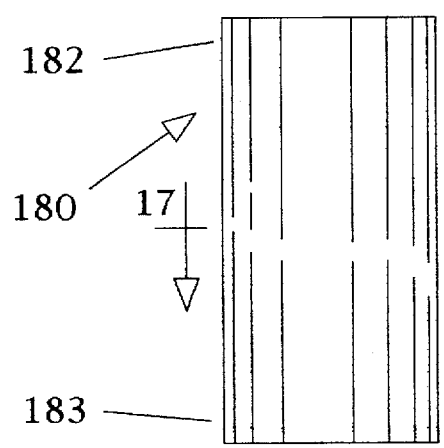
FIG. 16 is a view of an alternative species of coupling, having a hollow cylindrical body.
Figure 17:
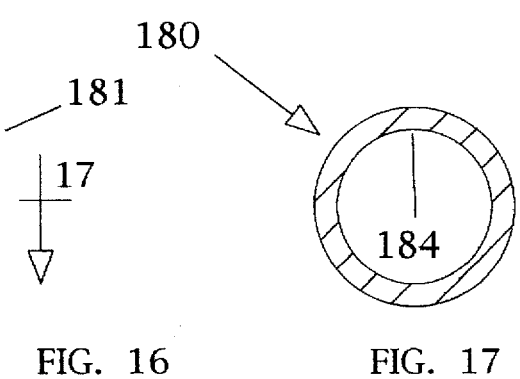
FIG. 17 is a cross-sectional view of the coupling of FIG. 16, taken along the 17—17 lines.

A second species of coupling 180 is seen in FIGS. 16 and 17. A round coupling 180 can be used to connect the anchor rod 160 to the extension rod 120 when the torque required to install the helix anchor 140 is less than average, due to soil conditions. The round coupling 180 has a tubular body 181 having a round cross-section, as seen in FIG. 17. Both the upper end 182 and the lower end 183 have internal threads 184. In applications where the round coupling 180 is used, the lower portion 127 of the extension rod 120 and the upper portion 163 of the anchor rod 160 would have to be threaded. The direction of the threads is chosen so that the connection between the extension rod 120, the round coupling 180, and the anchor rod 160 becomes tighter as the helix anchor is turned in the direction that causes it to go deeper into the soil.

Figure 18:
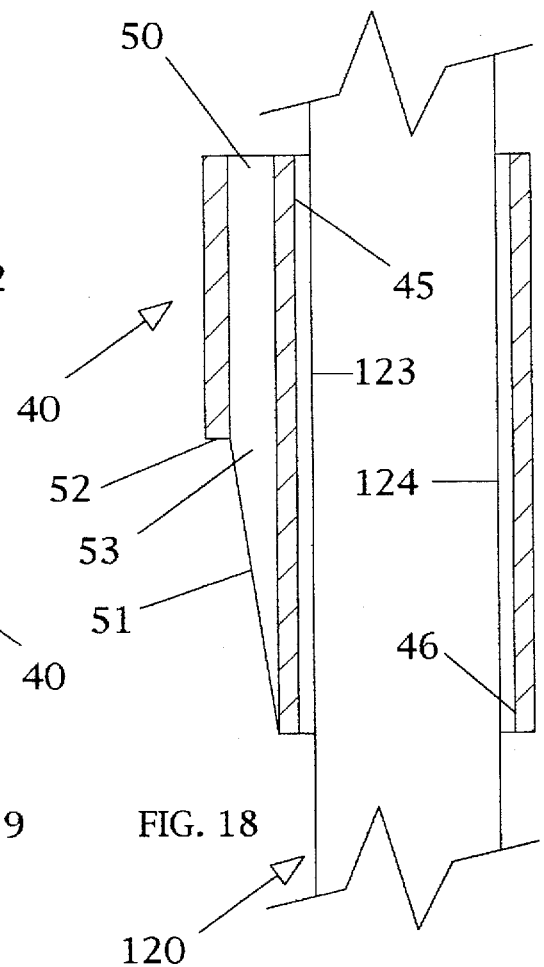
FIG. 18 is a cross-sectional view of the tie-down bracket when the pipeline is not floating, as seen in FIG. 1.

As seen in FIG. 1, an extension rod 120 connects to the upper portion 163 of the anchor rod 160 and carries the tie-down bracket 40 and, optionally, a spacer 60. In the preferred embodiment, the extension rod 120 is formed of a solid steel body 121 having flat sides 122. As seen in FIGS. 18 and 19, an inside side 123 faces the pipeline 500. An outside side 124, is oppositely directed, and faces away from the pipeline. An upper portion 125 has a bolt hole (not shown) for attachment to an upper coupling 80. In the preferred version of the invention, a lower portion 127 has a bolt hole for connection to a lower coupling 100. In a second version of the invention, the lower portion 127 is threaded to accept an internally threaded round coupling 180.

A first species of tie-down bracket 40 provides a tubular body 41 having a sleeve 47 that is attached by means of a welded connection 54. The tubular body 41 has an upper portion 42 and a lower portion 43. An axial channel 44 runs through the body 41, which is open at both ends. As seen in FIGS. 18 and 19, the axial channel 44 has an inside upper surface 45, and an inside lower surface 46.

As seen in FIG. 9A, the sleeve 47 provides a C-shaped rim 49 forming a channel 48 and an upper opening 50 through which passes a tie-down strap loop 22 or 23. The sleeve 47 has two side walls 55 separated by a middle wall 56, as seen in FIG. 9A. A pair of angled edges 51 and a horizontal edge 52 form a notched lower opening 53, seen in FIGS. 9D and 18.

As seen in FIGS. 9A-9C, 18, and 19, the tie-down bracket 40 will pivot about the extension rod 120. Therefore, as can be seen by comparison of FIGS. 12 and 13, the tie-down brackets of associated left and right anchor units 11, 12 will tend to rotate to allow the tie-down strap to be arranged in the most direct manner between the brackets 40. Therefore, if there is movement by the pipeline or the anchor unit 11, 12, the tie-down brackets 40 will pivot if necessary, to reduce the stress on the pipeline caused by the tie-down strap 20.

A second species of the tie-down bracket 40 is seen in FIGS. 4A and 9C. This species is substantially similar to the first species, but the body 41 and sleeve 47 are cast as a single piece, rather than having a welded connection 54.

A tie-down strap 20 passes over the top portion 501 of the pipe 500 and connects to the tie-down bracket 40 of each anchor unit 11, 12. A center portion 25 rests on the top 501 of the pipeline 500, while side portions 26 of the strap 20 touch the sides 503 of the pipe. As seen in FIGS. 3-4A, the tie-down strap 20 provides an elongate body 21 terminating in a left loop 22 and a right loop 23. Each loop is formed by means of a sewn attachment 24.

In the preferred embodiment, the strap ;20 is made of a polyester webbing material having a width that is somewhat wider than the middle wall 56 of sleeve 47 of tie-down bracket 40, as seen in FIGS. 12 and 13. Other materials could alternatively be used, but should be chosen for strength and the ability to resist both water and abrasion.

Optionally, a spacer 60 having a tubular body 61 having a circular cross-section may be carried by the extension rod 120 between the tie-down bracket 40 and the upper coupling 80. Using such a spacer allows a worker to force the tie-down bracket 40 downwardly to the position seen in FIG. 1. This work may be done from a distance in a position of safety. For example, in the situation where the pipe is located in in a trench, the worker may use the spacer and thereby avoid entering the trench. The tubular body 61 of the spacer is similar to an iron pipe in structure, and provides an upper portion 62 having an upper opening 63, and a lower portion 64 having a lower opening 65.

The upper coupling 80 attaches to a bolt hole on the upper portion 125 of the extension rod 120. Once attached to the extension rod, the spacer 60 if installed, and the tie-down bracket 40 can not be removed from the upper portion of the extension rod by an upward motion of the pipeline 500.

The pipeline anchor apparatus 10 of the invention is used to prevent a pipeline from floating, due to standing water or wet conditions, thereby preventing pipeline movement and the associated stresses and damage. To use the pipeline anchor apparatus of the invention, left and right anchor units 11, 12 are installed on opposite sides of a pipeline at intervals. A tie-down strap 20 is attached to each anchor unit and is passed over the top of the pipeline, thereby preventing pipeline movement.

To accomplish this, typically the helix anchor and anchor rod are inserted into the soil on both sides of a pipeline by known means. An extension rod may then be attached to the upper portion of the anchor rod, and the helix anchor sunk further into the earth until the approximate desired length of the upper portion of the extension rod remains above the soil. If the pipeline is in a trench 510 as in FIG. 1, it is typically desired to leave as much of the extension rod visible as required so that the upper portion of the extension rod is easily assessable by workers adjacent to the trench. If the pipeline is not in a trench or is in a shallow trench, as in FIG. 2, then only a short portion of the extension rod is left above the surface, as seen in that figure.

Once the helix anchor, anchor rod and extension rod are installed on each side of a pipeline, the tie-down strap 20, having each loop 22, 23 attached to a tie-down bracket 40, is placed over the top of the pipeline 500 and the tie-down brackets are placed in position with the extension rods 120 going through the axial channel 44 of the tie-down brackets 40, as seen in FIGS. 1 and 2.

If the portion of the extension rod 120 extending past the end of the tie-down bracket is quite small, then an upper coupling 80 may be installed, as seen in FIG. 4, with the lower bolt/nut 87.

However, if portion of the extension rod extending past the end of the tie-down bracket is somewhat larger, then upper bolt/nut 84 should be used to attach upper coupling 80 to the extension rod 120, as seen in FIG. 4A. Using the upper bolt 84 results in a greater portion of the upper coupling 80 hanging below the bolt hole in the upper portion 125 of the extension rod.

However, if the portion of the extension rod extending past the end of the tie-down bracket is quite lengthy, then a spacer 60 of appropriate length should be installed over the upper portion of the extension rod, as seen in FIGS. 1 and 3, prior to attaching the upper coupling 80. Use of the spacer allows workers to attach the upper coupling 80 from a distance, and in relative safety. After the spacer is installed, the installer then determines whether the upper bolt holes 83 or the lower bolt holes 86 should be used to attach the upper coupling.

In the event that water 511 is present, as seen in FIG. 15, the pipeline may attempt to float, and as a result produce an upward force on the tie-down strap 20. This force, is sufficient, may cause the tie-down brackets 40 to move from a relaxed position, as seen in FIG. 18, to a stressed position, as seen in FIG. 19. In the stressed position, the inside upper surface 45 of the axial channel 44 of the tie-down bracket 40 is forced against the inside side 123 of the extension rod 120, and the inside lower surface 46 of the of the axial channel 44 of the tie-down bracket 40 is forced against the outside side 124 of the extension rod. The stressed position, wherein the extension rod 120 is tilted slightly away from the pipeline, tends to result from the dimensions of the sleeve, and the sleeve's position radially outwardly from the axial channel 44 of the tie-down bracket 40. As a result, when under stress the extension rod may bend somewhat, as seen in FIG. 15. As a result of the outward (away from the pipeline) bending of the extension rod, spacers and other hardware, the sides 503 of the pipeline 500 are not dented by the pipeline anchor apparatus.

The previously described versions of the present invention have many advantages, including a flexible tie-down strap that distributes the forces caused by a pipeline's flotation more widely about the pipeline than is possible with a rigid tie-down component, and thus reduces the possibility of deformation of the pipeline.

It is a further advantage of the present invention to provide a novel pipeline anchor apparatus that provides a pivoting tie-down bracket supporting each end of the tie-down strap that pivots if necessary to reduce the strain on the tie-down strap, and to thereby incrementally move the flexible tie-down strap to reduce the possibility of deformation of the pipeline.

It is a further advantage of the present invention to provide a novel pipeline anchor apparatus that provides a spacer having a tubular body that may be positioned above the tie-down bracket on the extension rod of a helix anchor, forcing the tie-down bracket into place, while allowing workers to remain in safety above the pipeline and out of any associated pipeline trench.

It is a still further advantage of the present invention to provide a novel pipeline anchor apparatus that provides a tie-down bracket providing tubular body having a sleeve that is radially outwardly from the center of the axial channel through of the tubular body and which carries one end of a tie-down strap. Such a sleeve causes the pipeline anchor rod or extension rod to move slightly or bend in response to particularly strong forces caused by flotation of the pipeline in a direction away from the pipeline. As a result, the tendency of strong forces to deform the pipeline is lessened, because strong upward forces by the pipeline cause the pipeline anchor apparatus to move away from, rather than into, the side of the pipeline.

Although the present invention h been described in considerable detail and with reference to certain preferred versions, other versions are possible. For example, the upper coupling and the spacer elements could be combined into a single element, or a kit containing a plurality of different lengths of the combined element. Additionally, while bolts are the preferred method for attaching the extension rod and anchor rod to the lower coupling, and for attaching the upper coupling to the extension rod, other fasteners could also be used. Also, the anchor rod and extension rod could be combined in some applications, thereby eliminating the need for a lower coupling. Therefore, the spirit and scope of the appended claims should not be limited to the description of the preferred versions disclosed here.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A pipeline anchor apparatus, for holding a pipeline against the ground, the pipeline anchor apparatus comprising:

(A) left and right anchor units, each anchor unit comprising:

(a) anchoring means for holding the anchor unit with respect to the ground;

(b) an anchor rod, extending vertically from the anchoring means, the anchor rod having a lower portion attached to the anchoring means, and an upper portion;

(c) a tie-down bracket, having a tubular body having an axial channel through which the upper portion of the anchor rod passes, the tubular body having an attached sleeve defining a channel parallel to the axial channel of the tubular body, the sleeve having a notched lower opening; and (d) an upper coupling, attached to the upper portion of the anchor rod; and (B) a tie-down strap having left and right loops and a center portion, the left loop attached to the sleeve of the tie-down bracket of the left anchor unit and the right loop attached to the sleeve of the tie-down bracket of the right anchor unit, the center portion of the tie-down strap being adopted to pass over the pipeline.

2. A pipeline anchor apparatus, for holding a pipeline against the ground, the pipeline anchor apparatus comprising:

(A) left and right anchor units, each anchor unit comprising:

(a) anchoring means for holding the anchor unit with respect to the ground;

(b) an anchor rod, extending vertically from the anchoring means, the anchor rod having a lower portion attached to the anchoring means, and an upper portion;

(c) a lower coupling, attached to the upper portion of the anchor rod;

(d) an extension rod, extending vertically from the lower coupling, the extension rod having a lower portion attached to the lower coupling, and an upper portion;

(e) a tie-down bracket, having a tubular body having a axial channel through which the upper portion of the extension rod passes, the tubular body having an attached sleeve defining a channel parallel to the axial channel of the tubular body, the sleeve having a notched lower opening; and (f) an upper coupling, attached to the upper portion of the extension rod; and (B) a tie-down strap having left and right loops and a center portion, the left loop attached to the sleeve of the tie-down bracket of the left anchor unit and the right loop attached to the sleeve of the tie-down bracket of the right anchor unit, the center portion of the tie-down strap adapted to pass over the pipeline.

3. The pipeline anchor apparatus of claim 2, further comprising:
   (a) elongate spacer means, carried by the extension rod between the tie-down bracket and the upper coupling, for allowing workers to secure the tie-down bracket from a distance.

4. The pipeline anchor apparatus of claim 2, further comprising:
   (a) an elongate spacer, having a tubular body, carried by the extension rod between the tie-down bracket and the upper coupling.

5. A pipeline anchor apparatus, for holding a pipeline against the ground, the pipeline anchor apparatus comprising:
   (A) left and right anchor units, each anchor unit comprising:
      (a) a helix anchor, engageable with the ground;
      (b) an anchor rod, extending vertically from the helix anchor, the anchor rod having a lower portion attached to the helix anchor, and an upper portion, the anchor rod further comprising:
         (i) an upper bolt hole in the upper portion; and
         (ii) a lower wedge point at the end of the lower portion;
      (c) a lower coupling, attached to the upper portion of the anchor rod;
      (d) an extension rod, extending vertically from the lower coupling, the extension rod having a lower portion attached to the lower coupling, and an upper portion;
      (e) a tie-down bracket, having a tubular body having a axial channel through which the upper portion of the extension rod passes, the tie-down bracket further comprising:
         (i) a sleeve, attached to the tubular body of the tie-down bracket, the sleeve defining a channel parallel to the axial channel of the tubular body, the sleeve having an upper opening and a notched lower opening;
      (f) an upper coupling, attached to the upper portion of the extension rod; and
      (g) an elongate spacer, carried by the extension rod between the tie-down bracket and the upper coupling, comprising a tubular body having upper and lower openings; and
   (B) a tie-down strap having left and right loops and a center portion, the left loop attached to the sleeve of the tie-down bracket of the left anchor unit and the right loop attached to the sleeve of the tie-down bracket of the right anchor unit, the center portion of the tie-down strap being adapted to pass over the pipeline.

\* \* \* \* \*